United States Patent
Salzman

(10) Patent No.: US 10,625,546 B2
(45) Date of Patent: Apr. 21, 2020

(54) AIR SUPPLY SYSTEM FOR A WORK VEHICLE

(71) Applicant: CNH Industrial America LLC, New Holland, PA (US)

(72) Inventor: Eran Salzman, Glenview, IL (US)

(73) Assignee: CNH Industrial America LLC, New Holland, PA (US)

( * ) Notice: Subject to any disclaimer, the term of this patent is extended or adjusted under 35 U.S.C. 154(b) by 262 days.

(21) Appl. No.: 15/883,727

(22) Filed: Jan. 30, 2018

(65) Prior Publication Data

US 2019/0232735 A1 Aug. 1, 2019

(51) Int. Cl.
| | |
|---|---|
| *B60C 23/10* | (2006.01) |
| *B60T 13/58* | (2006.01) |
| *B60T 17/02* | (2006.01) |
| *B60C 23/00* | (2006.01) |
| *B60T 13/26* | (2006.01) |
| *B60T 17/00* | (2006.01) |

(52) U.S. Cl.
CPC ............ *B60C 23/10* (2013.01); *B60C 23/003* (2013.01); *B60T 13/26* (2013.01); *B60T 13/58* (2013.01); *B60T 17/02* (2013.01); *B60T 17/004* (2013.01); *B60T 2260/08* (2013.01)

(58) Field of Classification Search
CPC ..... B60C 23/10; B60C 23/001; B60C 23/002; B60C 23/003; B60C 23/0408
See application file for complete search history.

(56) References Cited

U.S. PATENT DOCUMENTS

| | | | |
|---|---|---|---|
| 5,544,688 A | 8/1996 | Freigang et al. | |
| 7,265,659 B2* | 9/2007 | Claussen | B60C 23/003 137/225 |
| 8,132,607 B2* | 3/2012 | Kusunoki | B60C 23/0408 152/415 |
| 2006/0180256 A1* | 8/2006 | Mittal | B60C 23/004 152/416 |
| 2019/0308471 A1* | 10/2019 | Fiorati | B60C 23/10 |

FOREIGN PATENT DOCUMENTS

| | | | | |
|---|---|---|---|---|
| DE | 10 2015 112 129 | * | 1/2017 | ............ F15B 1/02 |
| WO | 2008142679 | | 11/2008 | |
| WO | 201789916 | | 6/2017 | |

OTHER PUBLICATIONS

Machine translation of DE 10 2015 112 129, 16 pages (Year: 2017).*

* cited by examiner

*Primary Examiner* — Jason R Bellinger
(74) *Attorney, Agent, or Firm* — Rickard K. DeMille; Rebecca L. Henkel

(57) ABSTRACT

An air supply system for a work vehicle includes a compressor configured to compress a first supply of ambient air and to output a compressed air supply via a compressed air line, an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply, and a tire inflation system fluidly coupled to the air induction assembly and configured to selectively increase and decrease an air pressure within a tire of the work vehicle.

20 Claims, 5 Drawing Sheets

AIR SUPPLY SYSTEM FOR A WORK VEHICLE

BACKGROUND

The present disclosure relates generally to an air system for a work vehicle.

Certain work vehicles (e.g., tractors, harvesters, skid steers, etc.) are configured to operate on a variety of terrains. For example, work vehicles may be operated on roads. While the work vehicle is operating on a road, a greater tire pressure may be desired to improve efficiency and to reduce wear on the tires. Work vehicles may also be operated in fields. While the work vehicle is operating in a field, a lower tire pressure may be desired to improve traction and to decrease pressure on the ground. Additionally, certain work vehicles are configured to tow and/or carry varied loads. Some work vehicles include a tire inflation system that may facilitate inflation and deflation of the tires of the work vehicle (e.g., during operation of the work vehicle) by utilizing a compressor of the work vehicle. Thus, the air pressure within the tires of the work vehicle may be adjusted based on the expected terrain. However, such tire inflation systems may be limited by the output of the compressor of the work vehicle. For example, the work vehicle may include large tires and the use of the compressor of the work vehicle to increase the air pressure within the tires may take a long time, thereby delaying agricultural operation. Further, operating the compressor of the work vehicle may use a large amount of fuel.

BRIEF DESCRIPTION

In one embodiment, an air supply system for a work vehicle includes a compressor configured to compress a first supply of ambient air and to output a compressed air supply via a compressed air line, an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply, and a tire inflation system fluidly coupled to the air induction assembly and configured to selectively increase and decrease an air pressure within a tire of the work vehicle.

In another embodiment, an air supply system for a work vehicle, includes a compressor configured to compress a first supply of ambient air and to output a compressed air supply via a compressed air line, an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply, wherein a total mass flow rate of the combination air supply comprises a sum of a mass flow rate of the compressed air supply and a mass flow rate of the second supply of ambient air, a tire inflation system fluidly coupled to the air induction assembly and configured to selectively increase and decrease an air pressure within a tire of the work vehicle, wherein the tire inflation system includes a pressure valve and a distribution line, wherein the pressure valve is disposed along the distribution line and configured to control the increase and decrease of the air pressure within the tire, a priority valve disposed between the air induction assembly and the tire inflation system, and a controller having a memory and a processor, wherein the controller is communicatively coupled to the priority valve and configured to control distribution of the combination air supply from the air induction assembly between the tire inflation system of the work vehicle and a brake system of the work vehicle.

In another embodiment, an air intake system for a work vehicle includes a compressor configured to compress a first supply of ambient air and output a compressed air supply via a compressed air line, and an air induction assembly configured to receive the compressed air supply from the compressed air line and to flow the compressed air supply through the air induction assembly to create a low pressure region sufficient to draw in a second supply of ambient air, wherein the body is configured to combine the second supply of ambient air with the compressed air supply to generate a combination air supply for use by a tire inflation system of the work vehicle, wherein the air induction assembly comprises a body, and wherein the body includes an input region, a constricted region, and a output region, or an orifice plate disposed within the body.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
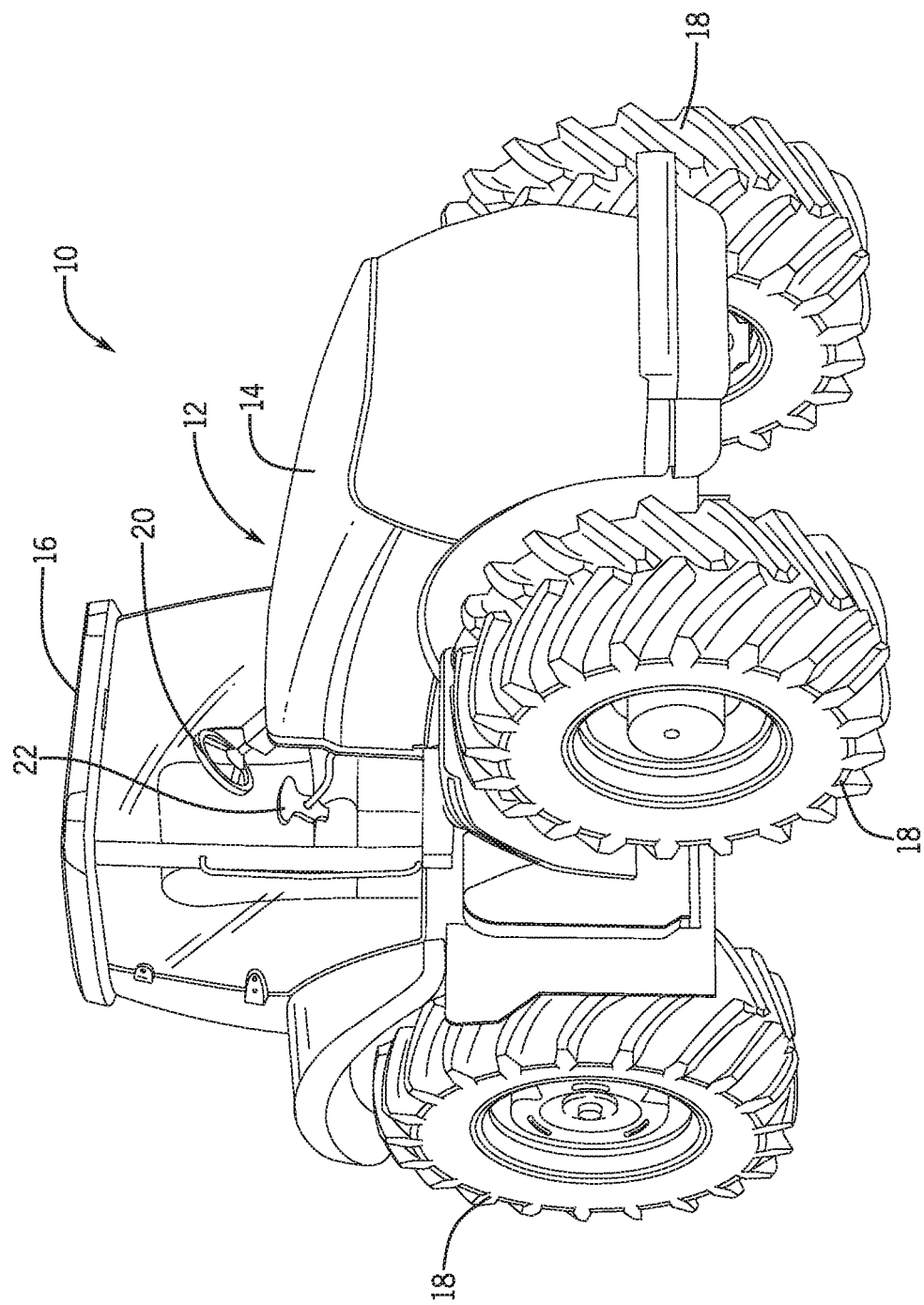
FIG. 1 is a perspective view of an embodiment of a work vehicle that includes an air supply system.

Turning to the drawings, FIG. 1 is a perspective view of an embodiment of a work vehicle 10 that includes an air supply system 12. In the illustrated embodiment, the work vehicle 10 includes a body 14 configured to house an engine, a transmission, the air supply system 12, other systems of the work vehicle 10, or a combination thereof. Additionally, the work vehicle 10 includes a cab 16 configured to house an operator. Moreover, the work vehicle 10 includes tires 18 (e.g., mounted on wheels), including front tires and back tires, configured to be driven by a drive system coupled to the engine and/or the transmission, thereby driving the work vehicle 10 along a field, a road, or any other suitable surface. The operator may steer the work vehicle 10 by manipulating or providing an input to a hand controller 20 within the cab 16. In the illustrated embodiment, the hand controller 20 is a steering wheel. However, the work vehicle 10 may be steered by any suitable controlling device, such as an electronic controlling device located within the work vehicle 10 or remote from the work vehicle 10. Additionally, the operator may slow or stop the work vehicle 10 by manipulating or providing an input to a brake pedal 22. Furthermore, the work vehicle 10 may be configured to be remotely controlled and/or to operate autonomously. While the illustrated work vehicle 10 is a tractor, it should be appreciated that the air supply system 12 described herein may be employed within any other suitable work vehicle, such as a truck, an automobile, a harvester, a sprayer, or a skid steer. As discussed in detail below, the air supply system 12 of the work vehicle 10 may control inflation, or inflation pressure, of each of the tires 18 of the work vehicle 10.

The air supply system 12 may include a tire inflation system, which may provide air to the individual tires 18 of the work vehicle 10. Further, the air supply system 12 may provide air to a pneumatic brake system of the work vehicle 10. In certain embodiments, the air supply system 12 includes an air induction assembly configured to passively draw ambient air into the air supply system 12 of the work vehicle 10. The air drawn into the air supply system 12 via the air induction assembly may be combined with a compressed air supply provided by a compressor, thereby increasing the volumetric flow rate of air within the air supply system 12 and, in turn, decreasing inflation time of a tire, as compared to only output of the compressor. Additionally, the air drawn into the air supply system 12 by the air induction assembly may decrease the temperature of the air within the air supply system 12, thus reducing a load on an air cooling system. In some embodiments, a controller of the work vehicle 10 may be configured to control distribution of the air from the air supply system to the tire inflation system and to the pneumatic brake system of the work vehicle 10, as well as to control distribution of the air to the individual tires 18 of the work vehicle 10.

Figure 2:
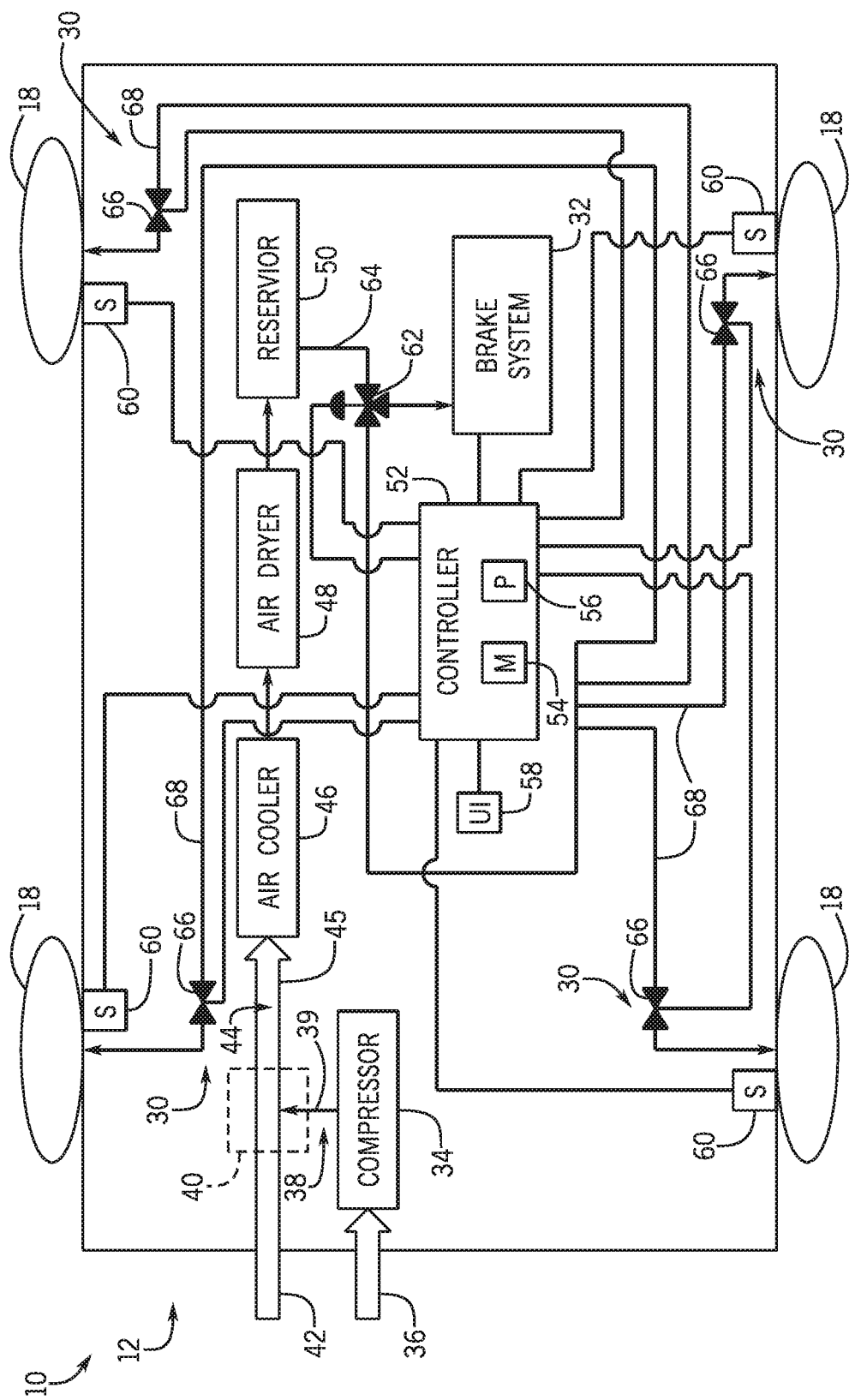
FIG. 2 is a schematic diagram of an embodiment of an air supply system having a tire inflation system that may be employed within the work vehicle of FIG. 1.

FIG. 2 is a schematic diagram of an embodiment of an air supply system 12 having a tire inflation system 30 that may be employed within the work vehicle 10 of FIG. 1. The air supply system 12 may include the tire inflation system 30, which may supply air to the tires 18 of the work vehicle 10. The air supply system 12 may also supply air to a pneumatic brake system 32 of the work vehicle 10. The air supply system 12 includes a compressor 34. The compressor 34 may be driven by the engine of the work vehicle (e.g., and controlled by a clutch positioned between the engine and the compressor). In some embodiments, the compressor 34 may be water cooled. The compressor 34 may receive ambient air 36 at atmospheric pressure, compress the air, and output compressed air at a higher pressure and a lower volume. The compressed air may then be used to pressurize the brakes of the pneumatic brake system 32 and/or to increase tire pressure via the tire inflation system 30. The compressor 34 may output the compressed air 38 via a compressed air line 39. In some embodiments, the compressed air line 39 may include a check valve that may block the compressed air 38 output from the compressor 34 from flowing back toward the compressor 34.

To decrease tire inflation time, the air supply system 12 includes an air induction assembly 40. The air induction assembly 40 (e.g., air amplifier) receives the compressed air 38 from the compressed air line 39 and uses the compressed air 38 to draw in ambient air 42. The air induction assembly 40 may include any suitable type of assembly configured to draw in ambient air using the compressed air, such as a venturi assembly, examples of which are discussed in greater detail with reference to FIGS. 3-5. The flow of the compressed air 38 through the air induction assembly 40 may passively draw the ambient air 42 by creating a low pressure area at the air induction assembly 40. The ambient air 42 drawn into the air induction assembly 40 may aggregate with the compressed air 38 from the compressed air line 39 to create a combination air flow 44 within a line 45 that may direct the combination air 44 into an air cooler 46. As such, the air induction assembly 40 may increase the volumetric flow rate of air into the air supply system 12 (e.g., as compared to only output of the compressor), which may in turn decrease inflation time of the individual tires 18 via the tire inflation system 30.

The line 45 may deliver the combination air 44 from the air induction assembly 40 to the air cooler 46 (e.g. radiator). Compressing the ambient air 36 via the compressor 34 may increase the temperature of the compressed air 38 output from the compressor 34 into the compressed air line 39. The temperature of the air when it is compressed may increase, for example, to around 250° C. To reduce the temperature of the combination air 44 for use in the tire inflation system 30 and/or pneumatic brake system 32, the combination air 44 from the line 45 output from the air induction assembly 40 may be directed through the air cooler 46. The air cooler 46 may include any suitable type of cooling assembly or heat exchanger. For example, the air cooler 46 may be a radiator which cools the combination air 44 via heat exchange between coolant and/or ambient air and the combination air 44. This in turn reduces the temperature of the combination air 44.

Additionally, the induction of the ambient air 42 into the air induction assembly 40 may help cool the combination air 44 before entering the air cooler 46. As such, the combination air 44 from the air induction assembly 40 in the line 45 may have a lower temperature than the compressed air 38 in the compressed air line 39 because the ambient air 42 may cool the compressed air 38 to establish a lower temperature combination air 44. Therefore, the induction of the ambient air 42 into the air induction assembly 40 may reduce the air temperature in the line 45 entering the air cooler 46 (e.g., as compared to only air output from the compressor) and, thus, may reduce the load on the air cooler 46. In some embodiments, the temperature reduction provided by the induction of the ambient air 42 into the air induction assembly 40 may be sufficient to obviate the air cooler 46 from the air supply system 12.

After the combination air 44 from the air induction assembly 40 in sufficiently cooled, the combination air 44 may be delivered to an air dryer 48 of the air supply system 12. The process of air compression within the compressor 34 may also concentrate any water vapor present, which may lead to condensation within the lines of the air supply system 12 as the combination air 44 cools downstream of the compressor 34, for example at the air cooler 46. The air dryer 48 (e.g., compressed air dryer) may remove water vapor from the combination air 44. Thus, the air dryer 48 may remove moisture to substantially reduce or eliminate condensation from occurring within the air supply system 12.

After moisture present in the combination air 44 has been removed by the air dryer 48, the combination air 44 may be delivered to a reservoir 50. The reservoir 50 may store the combination air 44 for use by the tire inflation system 30 and the pneumatic brake system 32.

The air supply system 12 includes a controller 52 that may be used to control distribution and delivery of the combination air 44. The controller 52 may control distribution and delivery of the combination air 44 between the pneumatic brake system 32 and the tire inflation system 30, as well as between individual tires 18 of the work vehicle 10. The controller 52 includes a memory 54 and a processor 56. In some embodiments, the memory 54 may include one or more tangible, non-transitory, computer-readable media that store instructions executable by the processor 56 and/or data to be processed by the processor 56. For example, the memory 54 may include access memory (RAM), read only memory (ROM), rewritable non-volatile memory such as flash memory, hard drives, optical discs, and/or the like. Additionally, the processor 56 may include one or more general purpose microprocessors, one or more application specific processors (ASICs), one or more field programmable logic arrays (FPGAs), or any combination thereof. The air supply system 12 may further include a user interface 58 or input/output (I/O) devices that may facilitate communication between the controller 52 and a user (e.g., operator). The user interface 58 may be disposed within the cab of the work vehicle 10 or at a remote location in the case of a remotely controlled or autonomously operated work vehicle 10. For example, the user interface 58 may include a button, a keyboard, a mouse, a trackpad, and/or the like to enable user interaction with the controller 52. Additionally, the user interface 58 may include an electronic display to facilitate providing a visual representation of information, for example, via a graphical user interface (GUI), an application interface, text, a still image, and/or video content.

In operation, the controller 52 may receive various input signals from sensors throughout the air supply system 12 and/or other components of the work vehicle 10 at the processor 56. In some embodiments, these input signals and/or control signals (e.g., instruction signals) output by the controller 52 may be stored in the memory 54. The input signals may be utilized individually or in various combinations to determine current usage of the combination air 44 within the air supply system 12 and current tire pressure of the individual tires 18 of the work vehicle 10. The controller 52 may further receive input signals from the user (e.g., operator) via the user interface 58 indicative of a target pressure of each tire 18 of the work vehicle 10. Additionally, the controller 52 may receive input signals indicative of current usage of the pneumatic brake system 32. The controller 52 may then output various instruction signals to valves and/or actuators of the air supply system 12 to control deliver of the combination air 44 to the tire inflation system 30 and to individual tires 18 of the work vehicle 10 to achieve a target pressure within each tire 18. The user interface 58 may send signals indicative of the target pressure of each tire 18 to the controller 52 based on input from the operator (e.g., based at least in part on a particular terrain on which the work vehicle is currently driving on and/or a load being towed by the work vehicle 10).

The controller 52 may receive one or more signals indicative of the current measured pressure of each tire 18 of the work vehicle 10 via pressure sensors 60. The pressure sensors 60 may be disposed at each tire 18 of the work vehicle and measure the current pressure within each tire 18. Each pressure sensor 60 may send signal(s) indicative of the current pressure within a respective tire 18 to the controller 52. The controller 52 may output one or more signals to the user interface 58 indicative of the measured tire pressure of each tire 18 of the work vehicle 10. Via the user interface 58, the operator positioned within the cab 16 of the work vehicle 10 or positioned remotely may view the measured tire pressure within each tire 18. Based at least in part on the current terrain and/or the load being pulled by the work vehicle 10, the operator may input to the controller 52, via the user interface 58, the target pressure for each tire 18 of the work vehicle 10. In some embodiments, the controller 52 may determine the target pressure of each tire 18 of the work vehicle 10 based at least in part on input signals (e.g., from the user interface 58, from load sensors, from terrain sensors, etc.) indicative of the terrain and/or or the load being towed. Based on the received or determined target pressure of each tire 18 of the work vehicle, the controller 52 may compare the current pressure of each tire 18 to the target pressure of each tire 18 and may determine whether to inflate or deflate each individual tire 18 such that the tire pressure corresponds to the target pressure.

As previously discussed, the air supply system 12 may supply the combination air 44 to the tire inflation system 30 and to the pneumatic brake system 32. The controller 52 may give priority to the pneumatic brake system 32, such that the controller 52 causes the combination air 44 from the reservoir 50 to be distributed first to the pneumatic brake system 32 for use in generating a braking force to slow or stop the work vehicle 10. When the pneumatic brake system 32 is not in use, for example when the work vehicle 10 is not being slowed or stopped, the controller 52 may cause the combination air 44 to be distributed to the tire inflation system 30 for use in varying the pressure within the tires 18 of the work vehicle 10. As such, the air supply system 12 includes a valve 62 disposed along a line 64 (e.g., pipe) extending from the reservoir 50 to the pneumatic brake system 32 and to the tire inflation system 30. The valve 62 may be a priority valve, three way valve, or other suitable valve that may give priority distribution of the combination air 44 from the reservoir 50 to the pneumatic brake system 32 over the tire inflation system 30. That is, the controller 52 may output a control signal to an actuator of the valve 62 indicative of instructions to open the valve 62 to a position such that the combination air 44 is distributed only to the pneumatic brake system 32 when an input to slow or stop the work vehicle 10 is received. The controller 52 may receive a signal indicative of a request to slow or stop the work vehicle 10 directly from the brake pedal of the work vehicle 10 or from the pneumatic brake system 32 indicative of current usage of the pneumatic brake system 32. Therefore, when the pneumatic brake system 32 is in use, the valve 62 may enable the combination air 44 to be supplied to the pneumatic brake system 32 and disable the combination air 44 to the tire inflation system 30.

When the pneumatic brake system 32 is not in use, the controller 52 may instruct distribution of the combination air 44 to the tire inflation system 30 for use in varying the pressure of the tires 18 to correspond to the input or determined target pressure. As such, the controller 52 may determine that the pneumatic brake system 32 is not currently in use (e.g., based on a signal received from the pneumatic brake system 32 indicative of the pneumatic brake system 32 not currently being in use, a lack of input signal from the brake pedal indicative of a request to slow or stop the work vehicle 10, or a lack of input signal from the pneumatic brake system 32 indicative of current use of the pneumatic brake system 32). If the controller 52 determines that the pneumatic brake system 32 is not currently in use, the controller 52 may, upon receiving an input signal indicative of the target pressure of the tires 18, control the valve 62 to enable the combination air 44 from the reservoir 50 to be distributed to the tire inflation system 30 to inflate the tires 18.

In some embodiments, the controller 52 may instruct adjustment of the pressure within each tire 18 of the work vehicle individually. In the illustrated embodiment, the air supply system 12 includes several valves 66 disposed along distribution lines 68 that are configured to direct the combination air 44 to each individual tire 18. There may be one valve 66 disposed along each distribution line 68 to control air flow to and from the corresponding tire 18 to increase or decrease the pressure within the tire 18. In other embodiments, the air supply system may include only one valve 66 that controls air flow to all tires 18 or several valves 66 that control air flow to groups of tires 18. When the target pressure is received by the controller 52 from the user interface 58 or determined by the controller 52 based on other inputs, the controller 52 may compare the current measured pressure of each tire 18 to the target pressure. As previously discussed, the controller 52 may determine the current pressure of each tire 18 based on signals received from pressure sensors 60 disposed at the tires 18 indicative of the current measured pressure within each tire 18. If the controller 52 determines that the current measured pressure of an individual tire 18 does not correspond to the target pressure, the controller 52 may send a control signal to the corresponding valve 66 to open to increase or decrease the pressure within the tire 18 based on the comparison until the current pressure of the tire 18 reaches the target pressure. Thus, the controller 52 may cause the air pressure within each tire 18 to correspond to the target pressure. In some embodiments, if the target pressure is lower than the current pressure of the tire 18, the controller 52 may cause air to be released from the tire 18 regardless of whether the pneumatic brake system 32 is currently in use, as availability of the combination air 44 from the air supply system 12 may not be utilized to release pressure from the tires 18.

As an example, if the work vehicle 10 is being driven onto a field from a road, the target pressure of the tires 18 may be lower than the current pressure of the tires 18. The lower tire pressure may enable greater tire contact with the ground, improve traction, increase fuel efficiency, and/or reduce ground pressure on the roots of the plants in the field. The controller 52 may receive one or more input signals (e.g., from the operator of the work vehicle 10 via the user interface 58) indicative of the target pressure, the terrain, the towed load, or a combination thereof. In some embodiments, input signals received from the user interface 58 may be indicative of a request to increase or decrease the pressure of one or more individual tires 18 of the work vehicle. The controller 52 may also receive signals from the pressure sensors 60 associated with the tires 18 indicative of the current measured pressure of each tire 18. The controller 52 may compare the current measured pressure of each tire 18 to the received or determined target pressure (e.g., determined based on the terrain, the towed load, etc.). If the controller 52 determines that the current pressure of a tire 18 is greater than the target pressure, the controller 52 may output signal(s) to the valve 66 associated with the tire 18 indicative of an instruction to open the valve 66 such that air is released from the tire 18 until the pressure of the tire 18 substantially corresponds to the target pressure (e.g., until the difference between the measured tire pressure and the target pressure is less than a threshold value). This process may be repeated for each tire, or the tire pressure for all or some of the tires may be adjusted concurrently. Signals from the pressure sensors 60 associated with the tires 18 indicative of the measured pressures may provide feedback to the controller 52 such that the controller 52 may determine when the target pressure is reached within each tire 18. When the controller 52 determines that the pressure in each tire 18 corresponds to the target pressure (e.g., the respective target pressure for each tire), the controller 52 may output instruction signals to the close the corresponding valves 66.

As another example, if the work vehicle 10 is being driven onto a road from a field, the target pressure of the tires 18 may be greater that the current pressure of the tires 18. The higher tire pressure may improve fuel efficiency, improve wear on the tires 18, and/or improve the ride of the work vehicle. The controller 52 may receive one or more input signals (e.g., from the operator of the work vehicle 10 via the user interface 58) indicative of the target pressure, the terrain, the towed load, or a combination thereof. In some embodiments, input signals received from the user interface 58 may be indicative of a request to increase or decrease the pressure of one or more individual tires 18 of the work vehicle. The controller 52 may also receive signals from the pressure sensors 60 associated with the tires 18 indicative of the current measured pressure of each tire 18. The controller 52 may compare the current measured pressure of each tire 18 to the received or determined target pressure (e.g., determined based on the terrain, the towed load, etc.). If the controller 52 determines that the current pressure of a tire 18 is lower than the target pressure, the controller 52 may then determine whether the combination air 44 is currently being used by the pneumatic brake system 32 to slow or stop the work vehicle 10, as previously discussed.

If the controller 52 determines that the pneumatic brake system 32 is not currently being used to slow or stop the work vehicle 10, the controller 52 my output a signal to the valve 62 disposed along the line 64 extending from the reservoir 50 to the pneumatic brake system 32 and to the tire inflation system 30 indicative of an instruction to control the valve 62 such that the combination air 44 is distributed to the tire inflation system 30. The controller 52 may also output one or more control signals to the valves 66 along the distribution lines 68 to control the valves 66 such that the combination air 44 is delivered to the corresponding tires 18 to increase the pressure within the tires 18 to substantially correspond to the target pressure(s). This process may be repeated for each tire 18 or the tire pressure may be adjusted for all or some of the tires 18 concurrently. As previously discussed, signals from the pressure sensors 60 associated with the tires 18 indicative of the measured pressures may provide feedback to the controller 52 such that the controller 52 may determine when the target pressure is reached within each tire 18. When the controller 52 determines that the pressure in each tire 18 corresponds to the target pressure (e.g., the respective target pressure for each tire), the controller 52 may output instruction signals to the control the corresponding valves 66 to close.

Figure 3:
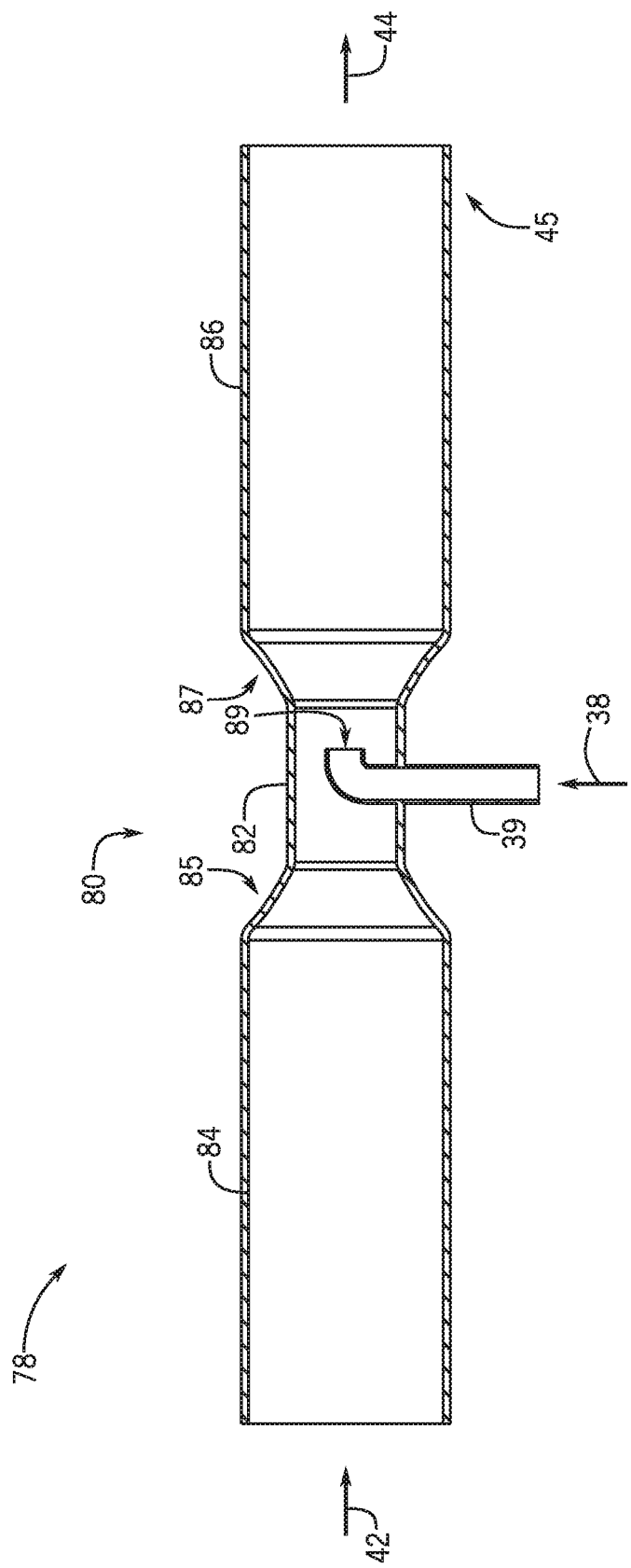
FIG. 3 is a cross-sectional view of an embodiment of an air induction assembly that may be employed within the air supply system of FIG. 2.

As previously discussed, the air supply system 12 includes an air induction assembly 40 configured to draw additional ambient air into the air supply system 12 to increase the total volumetric flow rate of air that may be used to control the pressure(s) of the tires 18 of the work vehicle 10. The air induction assembly 40 may be any suitable type of assembly configured to draw in ambient air. Each of the air induction assemblies discussed in FIGS. 3-5 may be used as the air induction assembly 40 of FIG. 2. FIG. 3 is a cross-sectional view of an embodiment of an air induction assembly 78 that may be employed within the air supply system of FIG. 2. In the illustrated embodiment, the air induction assembly 78 includes a venturi assembly 80, and a portion of the compressed air line 39 carrying the compressed air 38 output from the compressor 34 is positioned within the venturi assembly 80. The venturi assembly 80 includes a constricted section 82 between two wider sections (e.g., wider in diameter), an input section 84 and an output section 86. The input section 84 and the output section 86 each have a larger flow area that the constricted section 82. The input section 84 may join the constricted section 82 via a converging section 85 and the constricted section 82 may join the output section 86 via a diverging section 87. The wider output section 86 of the venturi assembly 80 may be the input of the line 45 that distributes the combination air 44 to the air cooler. In the illustrated embodiment, a curved portion 88 of the compressed air line 39 is disposed within the constricted section 82 of the venturi assembly 80 such that an outlet 89 of the compressed air line 39 is disposed within the constricted section 82 and configured to direct the compressed air 38 toward the wider output region 86.

In operation, the flow of the compressed air 38 from the constricted section 82, where it enters the venturi assembly 80 via the outlet 89 of the compressed air line 39, to the wider output section 86 establishes a lower pressure in the compressed section 82 as compared to the wider input section 84. Lower pressure at the constricted section 82 causes in the ambient air 42 from outside of the work vehicle 10 to be drawn into the venturi assembly 80. The ambient air 42 then combines with the compressed air 38 output from the compressor 34, resulting in an increase of the total volumetric air flow rate in the air supply system 12. As such, the total mass flow rate of the combination air 44 is the sum of the mass flow rate of the compressed air 38 output from the compressor 34 and the mass flow rate of the ambient air 42 drawn in via the air induction assembly 78.

The increased total volumetric air flow rate of the combination air 44 may provide reduced fill times for inflation of the tires 18 of the work vehicle 10 to the target pressure, as compared to utilizing only the output of the compressor. Additionally, as previously discussed, the addition of the ambient air 42 to the compressed air 38 may reduce the temperature of the combination air 44, thus reducing, and in some embodiments eliminating, the load on the air cooler of the air supply system.

In the illustrated embodiment, the wider input section 84 and the wider output section 86 of the venturi assembly 80 may have the same or different flow areas. As such, ratios of the flow area of the constricted section 82 to the flow area of the input section 84 and the output section 86 may be the same or different. The ratio of the flow area (e.g., expansion/contraction ratio) of the constricted section 82 to the flow area of the input section 84 and/or the output section 86 may be any suitable ratio (e.g., 1:2, 1:3, 1:4) configured to draw in ambient air 42 to increase the volumetric flow rate within the air supply system. Additionally, in some embodiments, a ratio of the flow area of the outlet 89 of the compressed air line 39 to the flow area of the constricted section 82 within which the outlet 89 is disposed may be any suitable ratio (e.g., 1:2, 1:3, 1:4) configured to create a low pressure region as the compressed air 38 moves from the compressed air line 39 to the constricted section 82 and to the output section 86. In the illustrated embodiment, the curved portion 88 of the compressed air line 39 opening to the outlet 89 is disposed within the constricted section 82 of the venturi assembly 80. In some embodiments, the portion of the compressed air line 39 approaching the outlet 89 may not be curved. Further, the outlet 89 of the compressed air line 39 is illustrated as a sufficiently straight outlet, however, in some embodiments, the outlet 89 may converge or diverge. In the illustrated embodiment, the converging section 85 and the diverging section 87 connecting the wider input and output sections 84, 86 and the constricted section 82 have straight walls. In other embodiments, the walls of the converging section 85 and/or the diverging section 87 may be rounded or have any other suitable arrangement.

Figure 4:
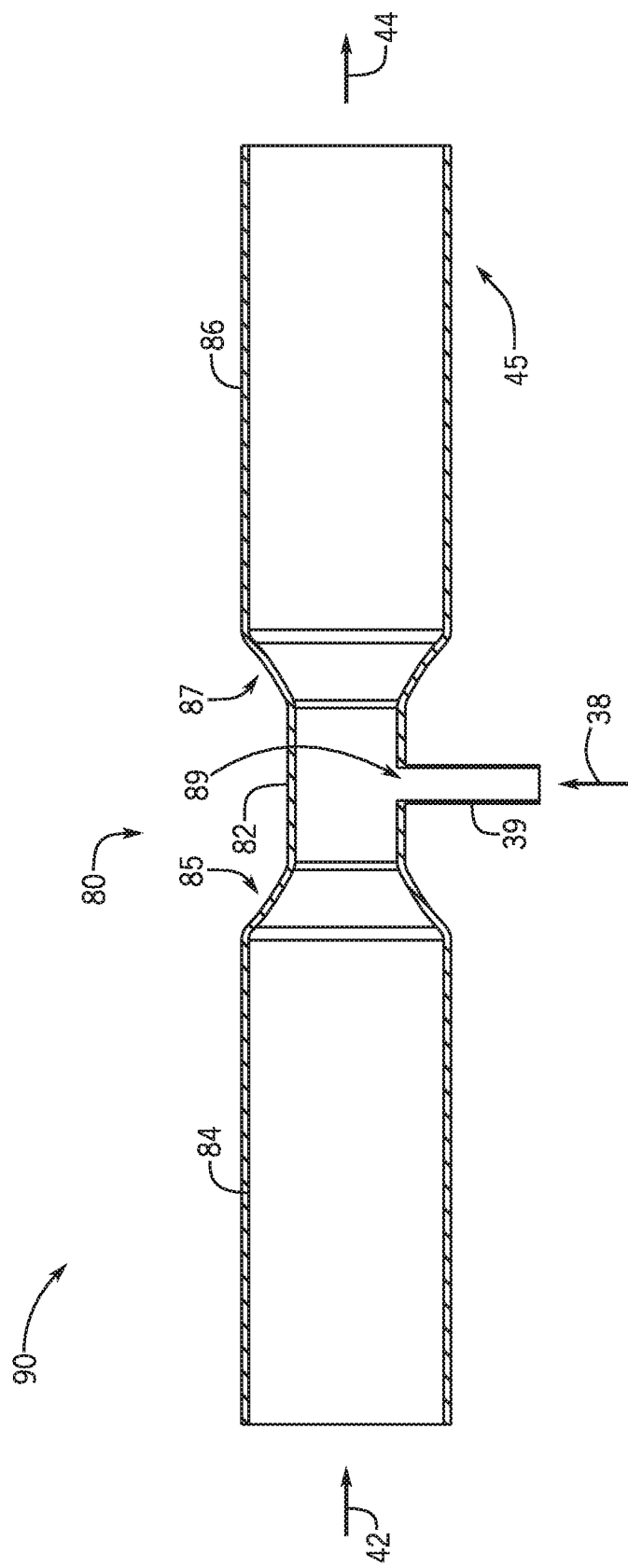
FIG. 4 is a cross-sectional view of another embodiment of an air induction assembly that may be employed within the air supply system of FIG. 2.

FIG. 4 is a cross-sectional view of another embodiment of an air induction assembly 90 that may be employed within the air supply system of FIG. 2. In the illustrated embodiment, the air induction assembly 90 includes a venturi assembly 80. The compressed air line 39 carrying the compressed air 38 output from the compressor 34 extends to the venturi assembly 80 such that the compressed air 38 flows through a side 92 of the constricted section 82. The venturi assembly 80 includes a constricted section 82 between two wider sections (e.g., wider in diameter), an input section 84 and an output section 86. The input section 84 and the output section 86 each have a larger flow area that the constricted section 82. The input section 84 may join the constricted section 82 via a converging section 85 and the constricted section 82 may join the output section 86 via a diverging section 87. The wider output section 86 of the venturi assembly 80 may be the input of the line 45 that distributes the combination air 44 to the air cooler.

In operation, the flow of the compressed air 38 from the constricted section 82, where it enters the venturi assembly 80 through the side 92 via the outlet 89 of the compressed air line 39, to the wider output section 86 establishes a lower pressure in the compressed section 82 as compared to the wider input section 84. Lower pressure at the constricted section 82 causes in the ambient air 42 from outside of the work vehicle 10 to be drawn into the venturi assembly 80. The ambient air 42 then combines with the compressed air 38 output from the compressor 34, resulting in an increase of the total volumetric air flow rate in the air supply system 12. As such, the total mass flow rate of the combination air 44 is the sum of the mass flow rate of the compressed air 38 output from the compressor 34 and the mass flow rate of the ambient air 42 drawn in via the air induction assembly 90.

In the illustrated embodiment, the wider input section 84 and the wider output section 86 of the venturi assembly 80 may have the same or different flow areas. As such, ratios of the flow area of the constricted section 82 to the flow area of the input section 84 and the output section 86 may be the same or different. The ratio of the flow area (e.g., expansion/contraction ratio) of the constricted section 82 to the flow area of the input section 84 and/or the output section 86 may be any suitable ratio (e.g., 1:2, 1:3, 1:4) configured to draw in ambient air 42 to increase the volumetric flow rate within the air supply system. Additionally, in some embodiments, a ratio of the flow area of the outlet 89 of the compressed air line 39 to the flow area of the constricted section 82 may be any suitable ratio (e.g., 1:2, 1:3, 1:4) configured to create a low pressure region as the compressed air 38 moves from the compressed air line 39 to the constricted section 82 and to the output section 86. Further, the outlet 89 of the compressed air line 39 is illustrated as a sufficiently straight outlet, however, in some embodiments, the outlet 89 may converge or diverge. In the illustrated embodiment, the converging section 85 and the diverging section 87 connecting the wider input and output sections 84, 86 and the constricted section 82 have straight walls. In other embodiments, the walls of the converging section 85 and/or the diverging section 87 may be rounded or have any other suitable arrangement.

Figure 5:
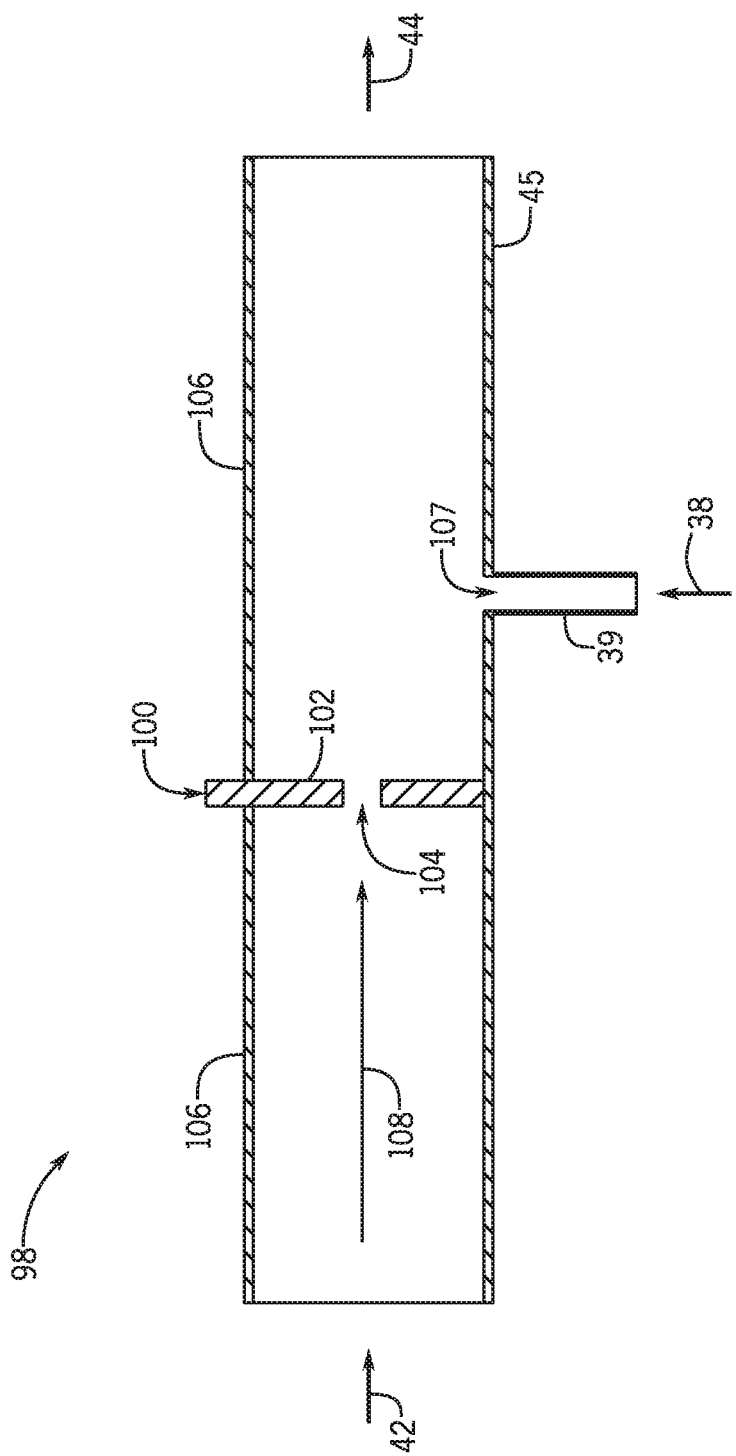
FIG. 5 is a cross-sectional view of a further embodiment of an air induction assembly that may be employed within the air supply system of FIG. 2.

In some embodiments, the air induction assembly 40 may establish the low pressure region via means other than the constricted section. FIG. 5 is a cross-sectional view of a further embodiment of an air induction assembly 98 that may be employed within the air supply system of FIG. 2. The air induction assembly 98 includes an orifice plate 100 that is used to create a low pressure region that may draw in the ambient air 42. The orifice plate may be a disk 102 of metal or other suitable material with an orifice 104 (e.g., opening). The orifice plate 100 is positioned within a body 106 of the air induction assembly 98 upstream of an outlet 107 of the compressed air line 39 relative to a direction 108 of flow of the ambient air 42. Similar to the constricted sections 82 of FIGS. 3 and 4, in operation, the flow of the compressed air 38 into the body 106 of the air induction assembly 98 to the line 45 establishes a lower pressure at the orifice 104 of the orifice plate as compared to the body 106 of the air induction assembly 98 upstream of the orifice plate 100 relative to the direction 108. Lower pressure at the orifice plate 100 causes the ambient air 42 from outside of the work vehicle 10 to be drawn into the air induction assembly 98. The ambient air 42 then combines with the compressed air 38 output from the compressor 34, resulting in an increase of the total volumetric air flow rate in the air supply system 12. As such, the total mass flow rate of the combination air 44 is the sum of the mass flow rate of the compressed air 38 output from the compressor 34 and the mass flow rate of the ambient air 42 drawn in via the air induction assembly 98. Therefore, the air induction assembly 98 having the orifice plate 100 may increase the total volumetric air flow rate within the air supply system 12, which may result in reduced fill times for reaching the target pressure of the tires 18, as compared to utilizing only the output of the compressor. Further, the ambient air 42 may reduce the temperature of the compressed air 38, thus reducing the load on the air cooler of the air supply system 12.

A ratio of the flow area of the orifice 104 of the orifice plate 100 to the flow area of the body 106 of the of the air induction assembly 98 may be any suitable ration (e.g., 1:2, 1:3, 1:4) configured to draw in ambient air 42 to increase the volumetric flow rate within the air supply system. In the illustrated embodiment, the body 106 of the air induction assembly 98 has a tube shape, however, in some embodiments, the body 106 may include converging and/or diverging section(s). Further, while the outlet 107 of the compressed air line 39 is shown in the illustrated embodiment at a particular distance downstream of the orifice plate 100 relative to the direction 108 of flow of the ambient air 42, the distance between the orifice plate 100 and the outlet 107 may be any suitable distance configured to enable the flow of the compressed air 38 to create a lower pressure at the orifice plate 100.

As previously discussed, the air induction assemblies 78, 90, and 98 may each be employed within the air supply system of FIG. 2 to draw in ambient air to increase the volumetric flow rate of air in the air supply system that may be used to increase and/or decrease the air pressure within the tires of the work vehicle.

The air supply system including the tire inflation system and the air induction assembly may enable individualized control of the pressure within each tire of the work vehicle (e.g., based on the terrain and/or a load being pulled by the work vehicle). Such control of the pressure of the tires may increase fuel efficiency of the work vehicle, improve wear on the tires of the work vehicle, improve traction of the tires on varying terrains, improve plant growth by reducing ground pressure when in a field, improve the ride of the work vehicle, and/or improve towing efficiency when towing varied loads. Further, the air induction assembly may draw additional ambient air into air supply system. Thus, the air induction assembly may increase the total volumetric air flow rate supplied by the air supply system to the tires, which may in turn, decrease fill time of the tires. Additionally, the air induction assembly may enable a reduction in the temperature of the air within the air supply system as the ambient air drawn in by the air induction assembly has a lower temperature than the air output from the compressor. Thus, the air induction assembly may reduce the load on the air cooler of the air supply system, and in some embodiments, may eliminate the air cooler, which may reduce costs.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An air supply system for a work vehicle, comprising:
    a compressor configured to compress a first supply of ambient air and to output a compressed air supply through a compressed air line;
    an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply; and
    a tire inflation system fluidly coupled to the air induction assembly and configured to selectively increase and decrease an air pressure within a tire of the work vehicle.

2. The air supply system of claim 1, wherein the tire inflation system comprises a pressure valve and a distribution line, wherein the pressure valve is disposed along the distribution line and configured to control the increase and decrease of the air pressure within the tire.

3. The air supply system of claim 1, comprising an air cooler fluidly coupled to the air induction assembly and configured to lower a temperature of the combination air supply.

4. The air supply system of claim 3, comprising an air dryer fluidly coupled to the air cooler and configured to remove water, water vapor, or a combination thereof, from the combination air supply.

5. The air supply system of claim 1, wherein the air induction assembly is configured in increase a total mass flow rate of the combination air supply such that the total mass flow rate of the combination air supply is greater than a mass flow rate of the compressed air supply.

6. The air supply system of claim 1, wherein the body of the air induction assembly comprises an input region, a constricted region, and an output region, wherein the compressed air line extends into the constricted region and is configured to direct flow of the compressed air supply toward the output region, wherein a flow area of the of the output region is greater than a flow area of the constricted region, and wherein the flow of the compressed air supply from the compressed air line to the output region is configured to create the low pressure region within the constricted region as compared to the input region to draw in the second supply of ambient air.

7. The air supply system of claim 1, wherein the body of the air induction assembly comprises an input region, a constricted region, and an output region, wherein the compressed air line extends to the constricted region and is configured to direct flow of the compressed air supply into the constricted region and toward the output region, wherein a flow area of the of the output region is greater than a flow area of the constricted region, and wherein the flow of the compressed air supply into the output region is configured to create the low pressure region within the constricted region as compared to the input region to draw in the second supply of ambient air.

8. The air supply system of claim 1, wherein the air induction assembly comprises an orifice plate disposed within the body upstream of the compressed air line relative to a direction of flow of the second supply of ambient air, wherein the orifice plate comprises a disk comprising an opening configured to flow the second supply of ambient air into the air supply system, wherein a flow area of the body is greater than a flow area of the opening, and wherein the flow of the compressed air supply into the air induction assembly downstream of the orifice plate relative to the direction of flow of the second supply of ambient air is configured to create the low pressure region within the opening of the orifice plate as compared to the body of the air induction assembly upstream of the orifice plate.

9. The air supply system of claim 1, comprising a priority valve disposed between the air induction assembly and the tire inflation system and a brake system of the work vehicle, wherein the priority valve is configured to prioritize distribution of the combination air supply to the brake system over the tire inflation system when it is determined that the brake system is in use.

10. An air supply system for a work vehicle, comprising:
a compressor configured to compress a first supply of ambient air and to output a compressed air supply through a compressed air line;
an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply, wherein a total mass flow rate of the combination air supply comprises a sum of a mass flow rate of the compressed air supply and a mass flow rate of the second supply of ambient air;
a tire inflation system fluidly coupled to the air induction assembly and configured to selectively increase and decrease an air pressure within a tire of the work vehicle, wherein the tire inflation system comprises a pressure valve and a distribution line, wherein the pressure valve is disposed along the distribution line and configured to control the increase and decrease of the air pressure within the tire;
a priority valve disposed between the air induction assembly and the tire inflation system; and
a controller comprising a memory and a processor, wherein the controller is communicatively coupled to the priority valve and configured to control distribution of the combination air supply from the air induction assembly between the tire inflation system of the work vehicle and a brake system of the work vehicle.

11. The air supply system of claim 10, wherein the body of the air induction assembly comprises an input region, a constricted region, and an output region, wherein the compressed air line extends into the constricted region and is configured to direct flow of the compressed air supply toward the output region, wherein a flow area of the of the output region is greater than a flow area of the constricted region, and wherein the flow of the compressed air supply from the compressed air line to the output region is configured to create the low pressure region within the constricted region as compared to the input region to draw in the second supply of ambient air.

12. The air supply system of claim 10, wherein the body of the air induction assembly comprises an input region, a constricted region, and an output region, wherein the compressed air line extends to the constricted region and is configured to direct flow of the compressed air supply into the constricted region and toward the output region, wherein a flow area of the of the output region is greater than a flow area of the constricted region, and wherein the flow of the compressed air supply into the output region is configured to create the low pressure region within the constricted region as compared to the input region to draw in the second supply of ambient air.

13. The air supply system of claim 10, wherein the air induction assembly comprises an orifice plate disposed within the body upstream of the compressed air line relative to a direction of flow of the second supply of ambient air, wherein the orifice plate comprises a disk comprising an opening configured to flow the second supply of ambient air into the air supply system, wherein a flow area of the body is greater than a flow area of the opening, and wherein the flow of the compressed air supply into the air induction assembly downstream of the orifice plate relative to the direction of flow of the second supply of ambient air is configured to create the low pressure region within the opening of the orifice plate as compared to the body of the air induction assembly upstream of the orifice plate.

14. The air supply system of claim 10, wherein the controller is configured to:
receive a first signal indicative of a target tire pressure of the tire of the work vehicle;
determine whether a difference between the air pressure within the tire of the work vehicle and the target tire pressure is greater than a threshold; and
output to the priority valve, in response to determining that the difference between the air pressure within the tire of the work vehicle and the target tire pressure is greater than the threshold, a second signal indicative of an instruction to control the priority valve such that the combination air supply is distributed to the tire inflation system.

15. The air supply system of claim 14, wherein the controller is configured to determine whether a brake system of the work vehicle is currently in use and to output the second signal in response to determining that the brake system is not currently in use.

16. The air supply system of claim 10, wherein the controller is communicatively coupled to the pressure valve, wherein the controller is configured to:
   receive a first signal indicative of a target tire pressure of the tire of the work vehicle;
   determine whether a difference between the air pressure within the tire of the work vehicle and the target tire pressure is greater than a threshold; and
   output to the pressure valve, in response to determining that the difference between the air pressure within the tire of the work vehicle and the target tire pressure is greater than the threshold, a second signal indicative of an instruction to open the pressure valve such that air is selectively released from the tire or the combination air supply is distributed to the tire.

17. The air supply system of claim 16, wherein the tire inflation system comprises a second pressure valve disposed along a second distribution line between the air induction assembly and a second tire of the work vehicle, wherein the second pressure valve is configured to control an increase and decrease of the air pressure within the second tire, wherein the controller is communicatively coupled to the second pressure valve, wherein the controller is configured to:
   receive a third signal indicative of a second target tire pressure of the second tire of the work vehicle;
   determine whether a difference between the air pressure within the second tire of the work vehicle and the second target tire pressure is greater than the threshold; and
   output to the second pressure valve, in response to determining that the difference between the air pressure within the second tire of the work vehicle and the second target tire pressure is greater than the threshold, a fourth signal indicative of an instruction to open the second pressure valve such that air is selectively released from the second tire or the combination air supply is distributed to the second tire.

18. The air supply system of claim 17, wherein the controller is configured to control the pressure valve and the second pressure valve individually to control the air pressure with the tire and the second tire individually.

19. An air intake system for a work vehicle, comprising:
   a compressor configured to compress a first supply of ambient air and output a compressed air supply through a compressed air line, and an air induction assembly configured to receive the compressed air supply from the compressed air line and to flow the compressed air supply through a body of the air induction assembly to create a low pressure region sufficient to draw in a second supply of ambient air, wherein the body is configured to combine the second supply of ambient air with the compressed air supply to generate a combination air supply for use by a tire inflation system of the work vehicle, wherein the air induction assembly comprises a body, and wherein the body comprises an input region, a constricted region, and a output region, or an orifice plate disposed within the body.

20. The air intake system of claim 19, wherein the air induction assembly is configured to increase a total mass flow rate of the combination air supply such that the total mass flow rate of the combination air supply comprises a sum of a mass flow rate of the compressed air supply and a mass flow rate of the second supply of ambient air drawn in by the air induction assembly.

* * * * *